US012783124B2

(12) United States Patent
Han et al.

(10) Patent No.: US 12,783,124 B2
(45) Date of Patent: Nov. 3, 2026

(54) STORAGE DEVICE CONTROLLING ACCESS TO HOST MEMORY BUFFER, SYSTEM, AND METHOD FOR OPERATING STORAGE DEVICE

(71) Applicant: SK hynix Inc., Icheon-si (KR)

(72) Inventors: Hyo Byung Han, Icheon-si (KR); Jae Gwan Kim, Icheon-si (KR); Hwan Hee Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 19/033,217

(22) Filed: Jan. 21, 2025

(65) Prior Publication Data

US 2026/0072590 A1 Mar. 12, 2026

(30) Foreign Application Priority Data

Sep. 10, 2024 (KR) ........................ 10-2024-0122756

(51) Int. Cl.
*G06F 3/06* (2006.01)

(52) U.S. Cl.
CPC ............ *G06F 3/061* (2013.01); *G06F 3/0647* (2013.01); *G06F 3/0656* (2013.01); *G06F 3/0673* (2013.01)

(58) Field of Classification Search
CPC ...... G06F 3/061; G06F 3/0647; G06F 3/0656; G06F 3/0673; G06F 3/0679
See application file for complete search history.

(56) References Cited

U.S. PATENT DOCUMENTS

| | | | | |
|---|---|---|---|---|
| 11,093,174 | B1 * | 8/2021 | Jang | G06F 12/0246 |
| 2011/0066789 | A1 * | 3/2011 | Wakrat | G06F 16/1727 711/E12.001 |
| 2016/0147482 | A1 * | 5/2016 | Jang | G06F 12/0246 711/103 |
| 2019/0227738 | A1 * | 7/2019 | Youn | G06F 3/0656 |
| 2020/0293676 | A1 * | 9/2020 | Hara | G06F 21/79 |
| 2024/0134696 | A1 | 4/2024 | Moshe et al. | |

FOREIGN PATENT DOCUMENTS

KR 10-2018-0016679 A 2/2018

* cited by examiner

*Primary Examiner* — Larry T Mackall

(57) ABSTRACT

A storage device includes a memory configured to store target data; and a controller configured to execute a target operation of accessing the target data. The controller sets a buffer associated with the target operation as a first buffer, determines a first access time interval on the basis of moving data read from the memory to the first buffer in the target operation, determines a second access time interval on the basis of moving data stored in the first buffer to the memory in the target operation, and changes the buffer associated with the target operation to a second buffer when at least one of the first access time interval and the second access time interval is equal to or longer than a preset threshold access time interval. The first buffer is located outside the storage device, and the second buffer is located inside the storage device.

18 Claims, 10 Drawing Sheets

STORAGE DEVICE CONTROLLING ACCESS TO HOST MEMORY BUFFER, SYSTEM, AND METHOD FOR OPERATING STORAGE DEVICE

CROSS-REFERENCE TO RELATED APPLICATION

The present application claims priority under 35 U.S.C. § 119(a) to Korean Patent Application No. 10-2024-0122756 filed in the Korean Intellectual Property Office on Sep. 10, 2024, which is incorporated herein by reference in its entirety.

BACKGROUND

1. Technical Field

Embodiments of the present disclosure generally relate to a storage device controlling an access to a host memory buffer, a system, and a method for operating a storage device.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

The controller may perform a specific operation using resources within the storage device. However, when the resources within the storage device are insufficient, the controller may use resources outside the storage device to increase the throughput of the corresponding operation.

SUMMARY

Various embodiments of the present disclosure are directed to providing a storage device, a system and a method for operating a storage device, capable of preventing performance degradation of a target operation in a situation where an access time to a host memory buffer rapidly increases.

In an aspect, a storage device may include: a memory configured to store target data; and a controller configured to execute a target operation of accessing the target data. The controller may set a buffer associated with the target operation as a first buffer, may determine a first access time interval on the basis of moving data read from the memory to the first buffer in the target operation, may determine a second access time interval on the basis of moving data stored in the first buffer to the memory in the target operation, and may change the buffer associated with the target operation to a second buffer when at least one of the first access time interval and the second access time interval is equal to or longer than a preset threshold access time interval. The first buffer may be located outside the storage device, and the second buffer may be located inside the storage device.

In another aspect, a method for operating a storage device may include: setting a buffer associated with a target operation of accessing target data as a first buffer, the target data being stored in a memory of the storage device; determining a first access time interval on the basis of moving data read from the memory to the first buffer in the target operation; determining a second access time interval on the basis of moving data stored in the first buffer to the memory in the target operation; and changing the buffer associated with the target operation to a second buffer when at least one of the first access time interval and the second access time interval is equal to or longer than a preset threshold access time interval. The first buffer may be located outside the storage device, and the second buffer may be located inside the storage device.

In still another aspect, a system may include: a host including a first buffer; and a storage device including a memory and a second buffer. The storage device may set a buffer associated with a target operation of accessing target data as the first buffer, may determine a first access time interval on the basis of moving data read from the memory to the first buffer in the target operation, may determine a second access time interval on the basis of moving data stored in the first buffer to the memory in the target operation, and may change the buffer associated with the target operation to the second buffer when at least one of the first access time interval and the second access time interval is equal to or longer than a preset threshold access time interval.

According to embodiments of the present disclosure, it is possible to prevent performance degradation of a target operation due to a rapid increase in an access time to a host memory buffer.

DETAILED DESCRIPTION

Figure 1:
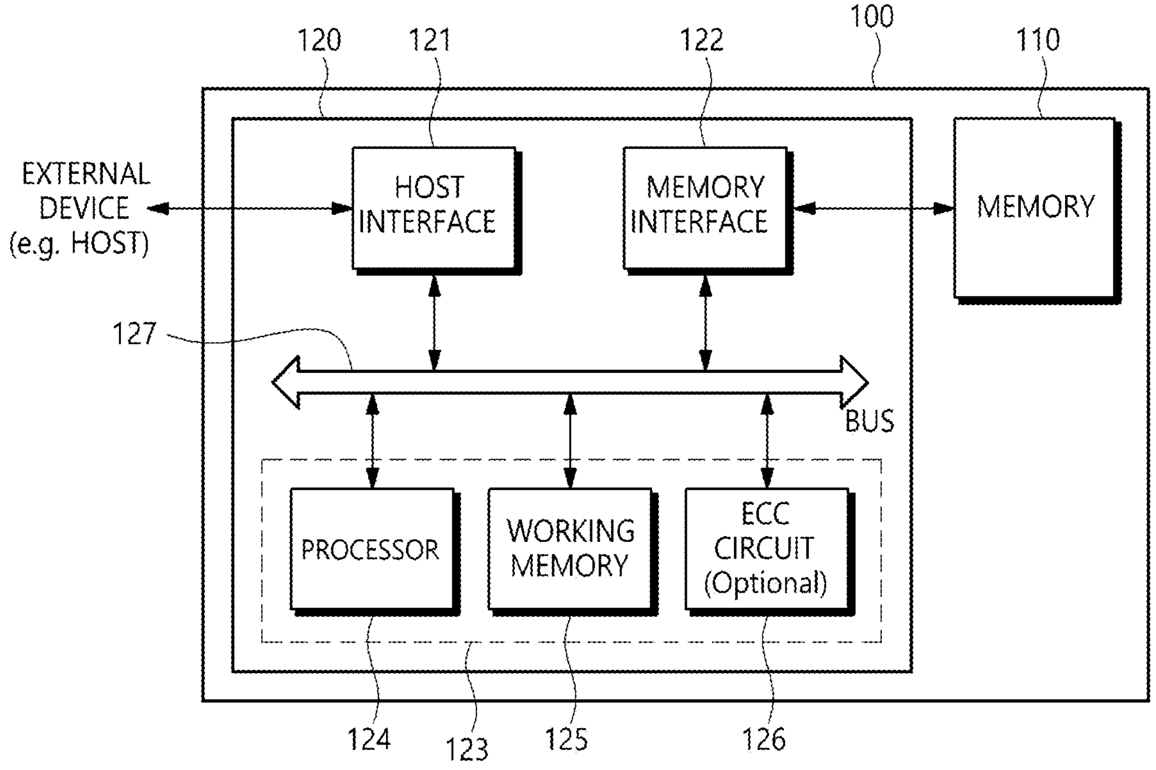
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only a single embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, embodiments of the present disclosure may be implemented in different forms and variations, and should not be construed as being limited to the embodiments set forth herein. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. Throughout the specification and claims, a list of items prefaced by a phrase such as "at least one of" or "one or more of" or "one or both of" indicates an inclusive list. For example, a list of "at least one of A and B" and a list of "one or both of A and B" each indicate A, or B, or AB (i.e., A and B).

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into a single device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may indicate a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

One or more components among the above-described components 121, 122, 124, 125 and 126 of the controller 120 may be omitted, or some components among the above-described components 121, 122, 124, 125 and 126 of the controller 120 may be integrated into a single component. In addition to the above-described components 121, 122, 124, 125 and 126 of the controller 120, one or more other components may be added.

Hereinbelow, the memory 110 will be described in further detail with reference to FIG. 2.

Figure 2:
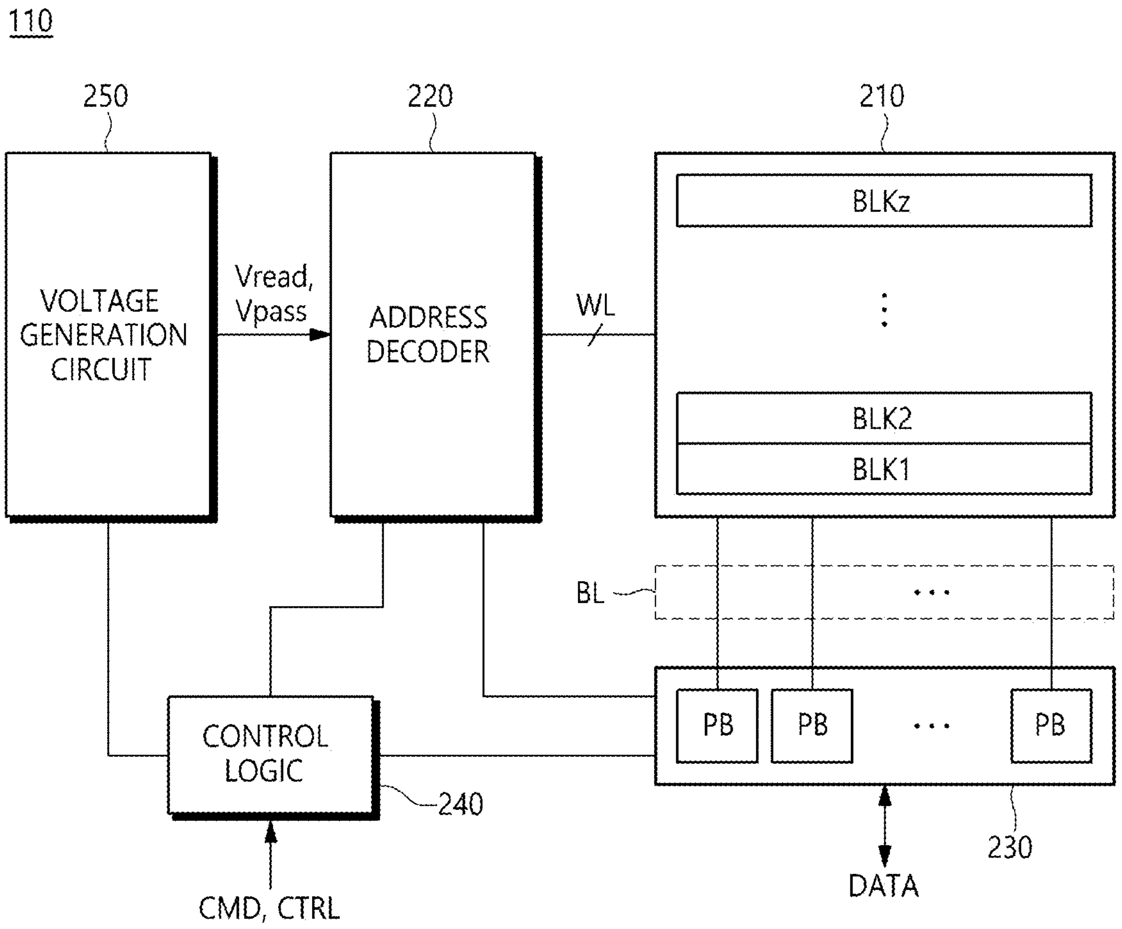
FIG. 2 is a block diagram schematically illustrating a memory of FIG. 1.

FIG. 2 is a block diagram schematically illustrating a memory 110 of FIG. 1 according to an embodiment of the present disclosure.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select a single memory block and a single word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then outputs data DATA to the input/output buffer of the memory 110. As an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
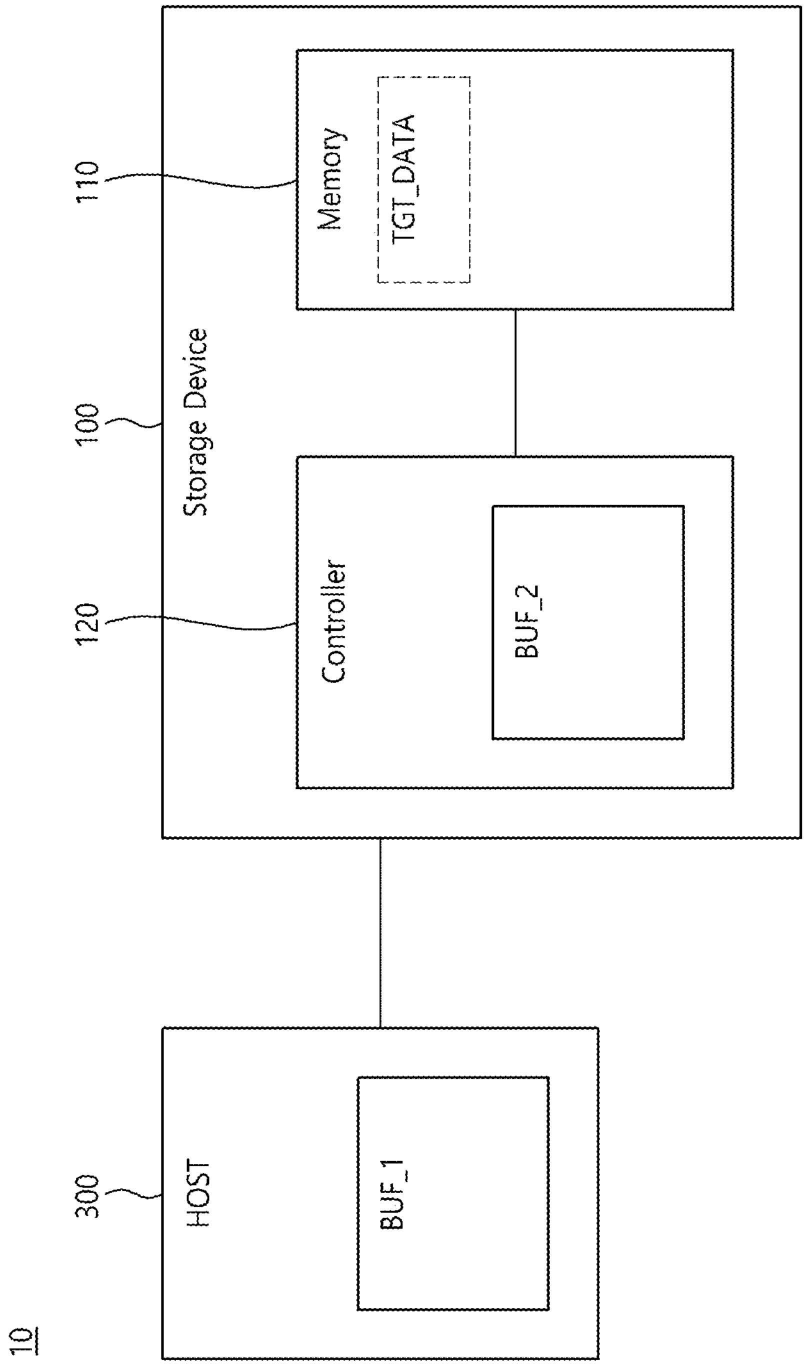
FIG. 3 is a diagram illustrating the schematic structure of a system according to embodiments of the present disclosure.

FIG. 3 is a diagram illustrating the schematic structure of a system 10 according to embodiments of the present disclosure.

Referring to FIG. 3, the system 10 may include a host 300 and a storage device 100.

The host 300 may include a first buffer BUF_1. The first buffer BUF_1 may be located outside the storage device 100, and may store data transmitted from the storage device 100. For example, the first buffer BUF_1 may be implemented with volatile memory (e.g., SRAM or DRAM) or nonvolatile memory (e.g., NAND Flash).

The storage device 100 may directly access the first buffer BUF_1. Specifically, the storage device 100 may write data to the first buffer BUF_1 or read data stored in the first buffer BUF_1 through direct memory access (DMA).

The storage device 100 may include a memory 110 and a controller 120.

The memory 110 may store target data TGT_DATA.

For example, the target data TGT_DATA may be user data which is written to the storage device 100 by the host 300.

For another example, the target data TGT_DATA may be metadata for user data.

The controller 120 may execute a target operation of accessing the target data TGT_DATA. In some embodiments, the controller 120 may determine a buffer associated with the target operation as the first buffer BUF_1 or a second buffer BUF_2. For example, The controller 120 may determine a buffer to be used for the target operation as the first buffer BUF_1 which is located outside the storage device 100 or a second buffer BUF_2 which is located inside the storage device 100.

For example, the second buffer BUF_2 may be the working memory 125 described above with reference to FIG. 1.

In the embodiment of FIG. 3, a case where the location of the second buffer BUF_2 is the inside of the controller 120 is described, but embodiments of the present disclosure are not limited thereto. For example, the second buffer BUF_2 may be located outside the controller 120.

The storage capacity of the first buffer BUF_1 may be greater than the storage capacity of the second buffer BUF_2.

Figure 4:
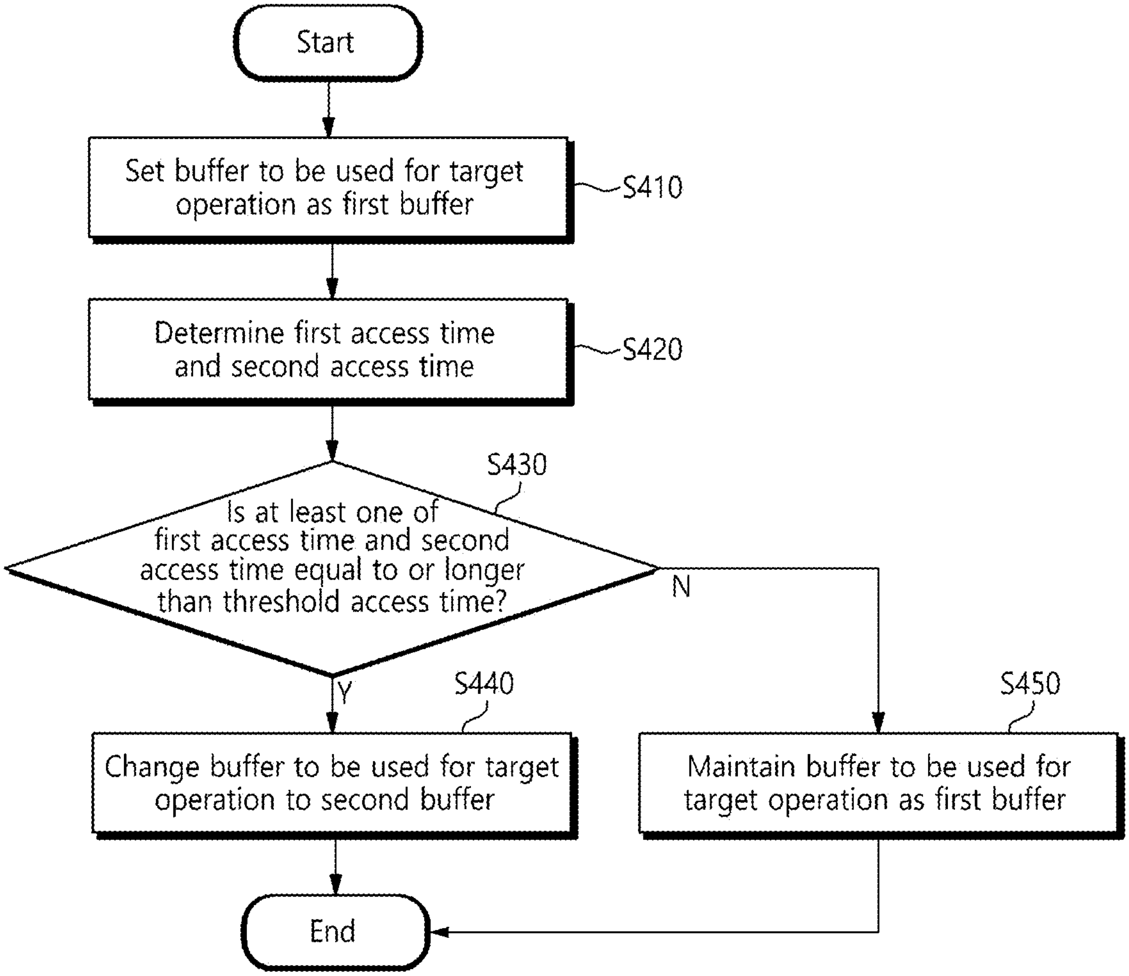
FIG. 4 is a flowchart illustrating an operation of a storage device according to embodiments of the present disclosure.

FIG. 4 is a flowchart illustrating an operation of a storage device (e.g., the storage device 100 in FIG. 1 or FIG. 3) according to embodiments of the present disclosure.

Referring to FIG. 4, the controller 120 of the storage device 100 may set a buffer associated with the target operation (e.g., a buffer to be used for the target operation) as the first buffer BUF_1 (S410). This is to prevent performance degradation of the target operation and increase the throughput of the target operation by using the first buffer BUF_1 located outside the storage device 100 when resources inside the storage device 100 required for the target operation are relatively limited (e.g., DRAM-less storage device).

The controller 120 may determine a first access time (or a first access time interval) and a second access time (or a second access time interval) (S420).

In some embodiments, the controller 120 may determine the first access time interval on the basis of moving data read from the memory 110 to the first buffer BUF_1 in the target operation. For example, the controller 120 may determine the first access time interval on the basis of an operation of moving data read from the memory 110 to the first buffer BUF_1 in the target operation.

In some embodiments, the controller 120 may determine the second access time interval on the basis of moving data stored in the first buffer BUF_1 to the memory 110 in the target operation. For example, the controller 120 may determine the second access time interval on the basis of an operation of moving data stored in the first buffer BUF_1 to the memory 110 in the target operation.

The controller 120 determines whether at least one of the first access time interval and the second access time interval is equal to or longer than a preset threshold access time (or a preset threshold access time interval) (S430).

When at least one of the first access time and the second access time is equal to or longer than the threshold access time (S430—Y), the controller 120 may change the buffer associated with the target operation from the first buffer BUF_1 to the second buffer BUF_2 (S440).

When at least one of the first access time and the second access time is equal to or longer than the threshold access time, a time interval required in the process of transmitting data to the first buffer BUF_1 and receiving data from the first buffer BUF_1 again during the target operation may increase. In this case, performance of the target operation may degrade compared to when the target operation is performed using the second buffer BUF_2 inside the storage device 100.

Accordingly, by executing the target operation using the second buffer BUF_2 instead of the first buffer BUF_1, the controller 120 may prevent performance degradation of the target operation and ensure at least a predetermined level of performance. In other words, even when at least one of the first access time and the second access time increases to be equal to or longer than the threshold access time, the performance of the target operation may maintain the predetermined level by changing the buffer associated with the targe operation from the first buffer BUF_1 to the second buffer BUF_2.

On the other hand, when both the first access time and the second access time are shorter than the threshold access time (S430—N), the controller 120 may maintain the buffer associated with the target operation as the first buffer BUF_1 (S450).

Figure 5:
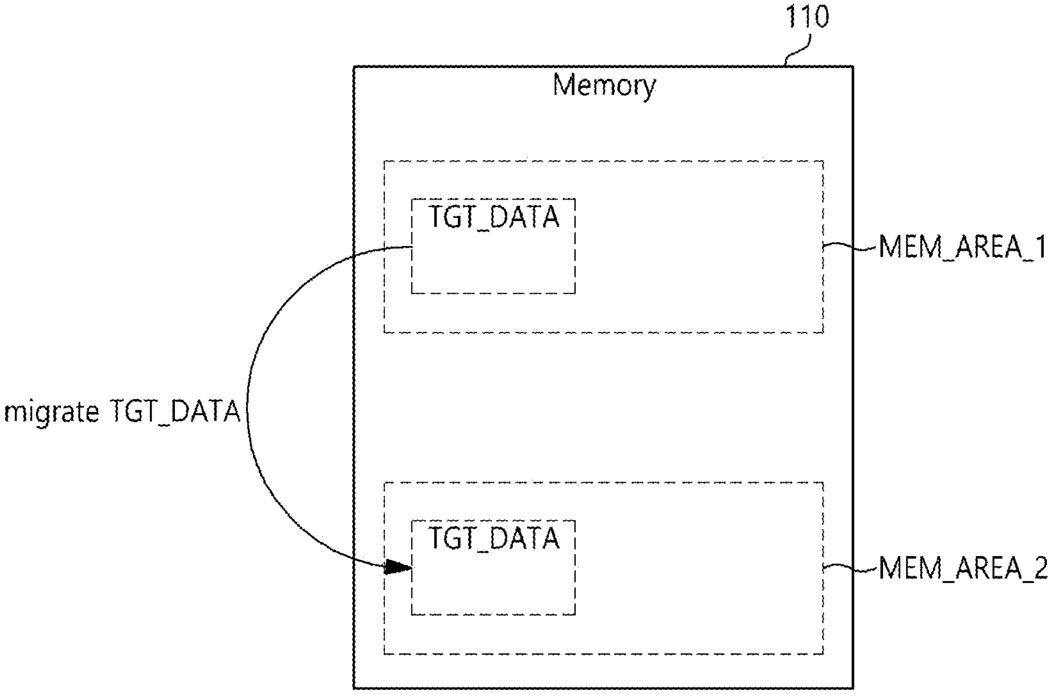
FIG. 5 is a diagram illustrating a target operation according to embodiments of the present disclosure.

FIG. 5 is a diagram illustrating a target operation according to embodiments of the present disclosure.

Referring to FIG. 5, the target operation may be an operation of migrating the target data TGT_DATA from a first memory area MEM_AREA_1 to a second memory area MEM_AREA_2 that are within the memory 110.

For example, the target operation may be a garbage collection operation or a read reclaim operation.

In the embodiments of the present disclosure, the controller 120 of the storage device 100 may determine the first access time (or the first access time interval) and the second access time (or the second access time interval) as follows.

As described above, the controller 120 may determine the first access time interval and the second access time interval on the basis of one or more data movement time intervals between a page buffer included in the memory 110 and the first buffer BUF_1.

First, the controller 120 may determine a first average movement time interval as the first access time interval, where the first average movement time interval is the average of first movement time intervals in a predetermined first time period. During each of the first movement time intervals, data is moved from the page buffer to the first buffer BUF_1.

The controller 120 may determine a second average movement time interval as the second access time interval, where the second average movement time interval is the average of second movement time intervals in a predetermined second time period. During each of the second movement time intervals, data is moved from the first buffer BUF_1 to the page buffer.

Hereinafter, this will be described in detail with reference to FIGS. 6 and 7.

Figure 6:
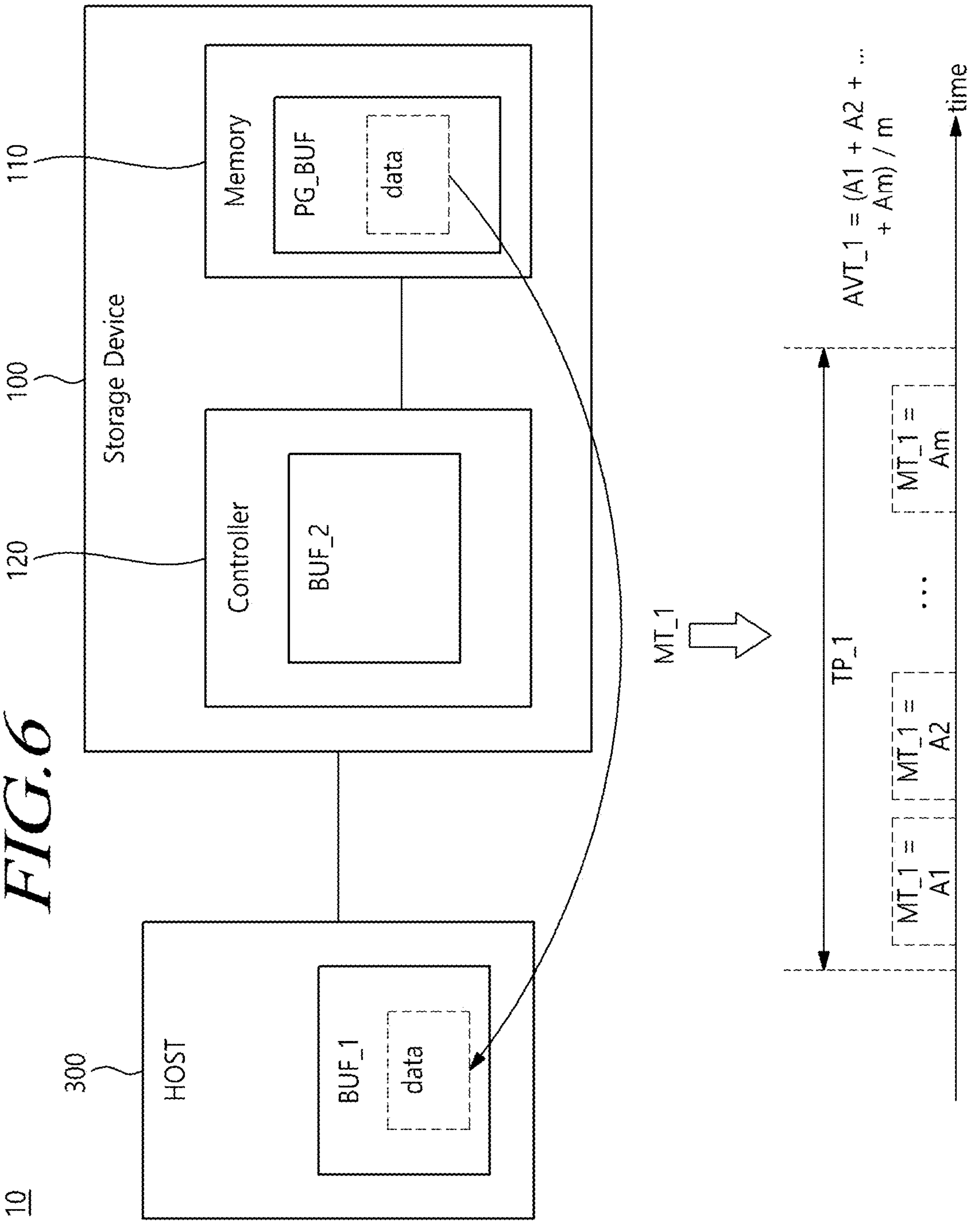
FIG. 6 is a diagram illustrating an operation in which the storage device according to embodiments of the present disclosure determines a first average movement time interval.

FIG. 6 is a diagram illustrating an operation in which the storage device 100 according to embodiments of the present disclosure determines a first average movement time interval AVT_1.

Referring to FIG. 6, the controller 120 of the storage device 100 may measure a first movement time (or a first movement time interval) MT_1, which is a time interval required for data to be moved from a page buffer PG_BUF included in the memory 110 to the first buffer BUF_1 (i.e. time interval from a time point at which data starts moving from the page buffer PG_BUF to the first buffer BUF_1 to a time point at which data completes moving from the page buffer PG_BUF to the first buffer BUF_1) in a predetermined first time period TP_1.

For example, data may be moved from the page buffer PG_BUF to the first buffer BUF_1 through direct memory access (DMA).

For example, data to be moved from the page buffer PG_BUF to the first buffer BUF_1 may be entirety or a part of the target data TGT_DATA.

The controller 120 may measure each of the first movement time intervals MT_1 while the memory 110 outputs data to the controller 120.

The memory 110 may first load stored data into the page buffer PG_BUF and output the loaded data to the controller 120. The data loaded into the page buffer PG_BUF may be moved to the first buffer BUF_1 through DMA.

In FIG. 6, in the first time period TP_1, data movement from the page buffer PG_BUF to the first buffer BUF_1 has occurred m (m is a natural number) times, and first movement time intervals MT_1 for the $1^{st}$ time, $2^{nd}$ time, and m-th time of data movement are denoted by A1, A2, . . . , Am, respectively.

The first average movement time interval AVT_1 is determined as (A1+A2+ . . . +Am)/m. Although the first average movement time interval AVT_1 according to the embodiment of FIG. 6 is an arithmetic average, embodiments of the present disclosure are not limited thereto. In some embodiments, the first average movement time interval AVT_1 may be a weighted average. For example, where w1, w2, . . . , and wm are weights on A1, A2, . . . , and Am, respectively, the first average movement time interval AVT_1 may be determined by increasing weights on more recent movement time intervals in the predetermined first time period TP_1, such that w1<w2< . . . <wm.

Figure 7:
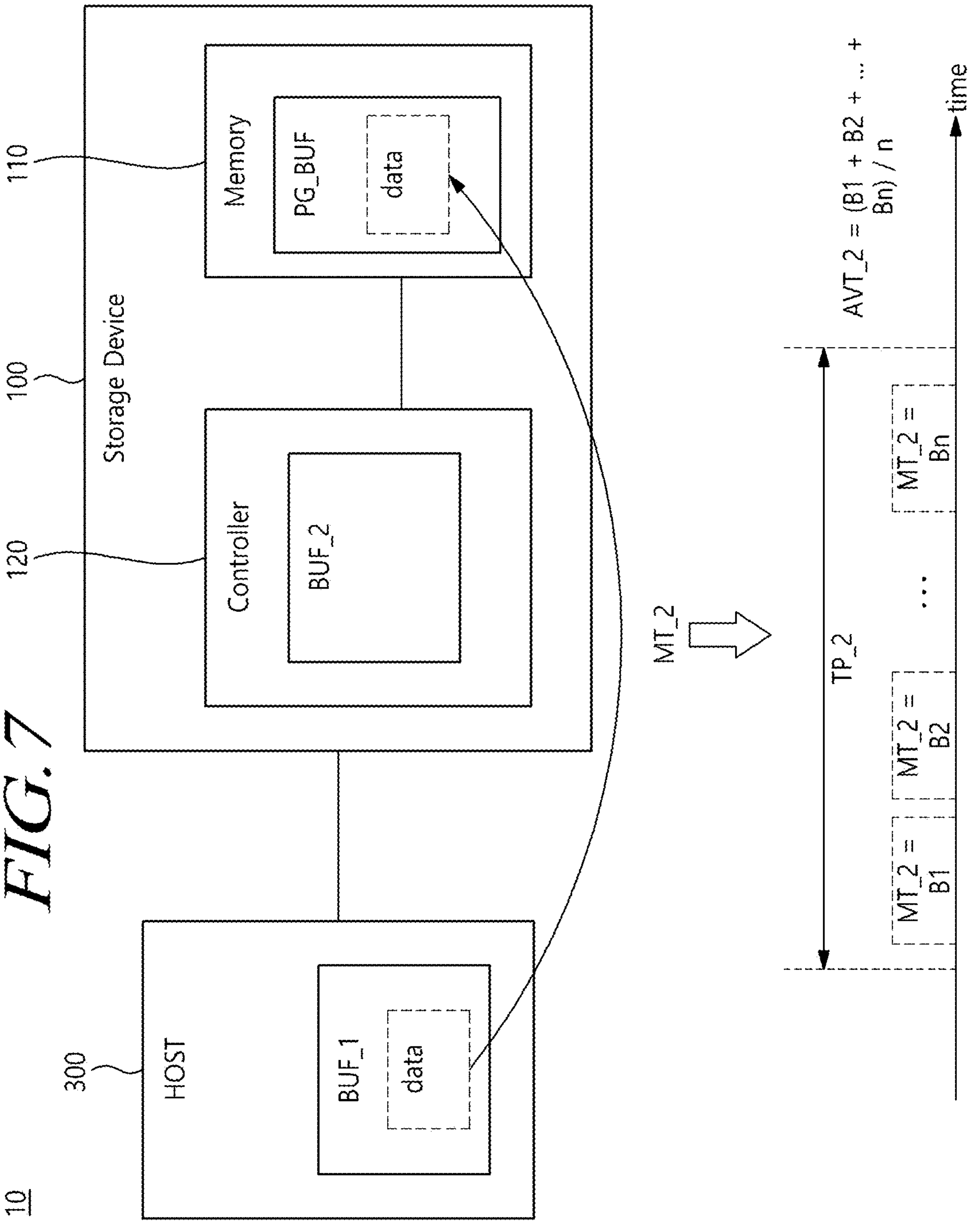
FIG. 7 is a diagram illustrating an operation in which the storage device according to embodiments of the present disclosure determines a second average movement time interval.

FIG. 7 is a diagram illustrating an operation in which the storage device 100 according to embodiments of the present disclosure determines a second average movement time interval AVT_2.

Referring to FIG. 7, the controller 120 of the storage device 100 may measure a second movement time (or a second movement time interval) MT_2, which is a time interval required for data to be moved from the first buffer BUF_1 to the page buffer PG_BUF included in the memory 110 in a predetermined second time period TP_2.

For example, data may be moved from the first buffer BUF_1 to the page buffer PG_BUF through direct memory access (DMA).

For example, data to be moved from the first buffer BUF_1 to the page buffer PG_BUF may be entirety or a part of the target data TGT_DATA.

For example, the controller 120 may measure each of the second movement time MT_2 intervals while inputting data to the memory 110.

The memory 110 may first temporarily store the inputted data in the page buffer PG_BUF and write the data temporarily stored in the page buffer PG_BUF to the inside thereof.

In FIG. 7, in the second time period TP_2, data movement from the first buffer BUF_1 to the page buffer PG_BUF has occurred n (n is a natural number) times, and second movement time intervals MT_2 for the $1^{st}$ time, $2^{nd}$ time, and n-th time of data movement are denoted by B1, B2, . . . , Bn, respectively.

The second average movement time interval AVT_2 is determined as (B1+B2+ . . . +Bn)/n. Although the second average movement time interval AVT_2 according to the embodiment of FIG. 7 is an arithmetic average, embodiments of the present disclosure are not limited thereto. In some embodiments, the second average movement time interval AVT_2 may be a weighted average. For example, where w1, w2, . . . , and wn are weights on B1, B2, . . . , and Bn, respectively, the second average movement time interval AVT_2 may be determined by increasing weights on more recent movement time intervals in the predetermined second time period TP_2, such that w1<w2< . . . <wn.

In the above, an operation in which the storage device 100 changes a buffer to be used for the target operation from the first buffer BUF_1 to the second buffer BUF_2 has been described.

After changing a buffer to be used for the target operation to the second buffer BUF_2, when a specific condition is satisfied, the storage device 100 may change again a buffer to be used for the target operation to the first buffer BUF_1. This will be described below in detail with reference to FIG. 8.

Figure 8:
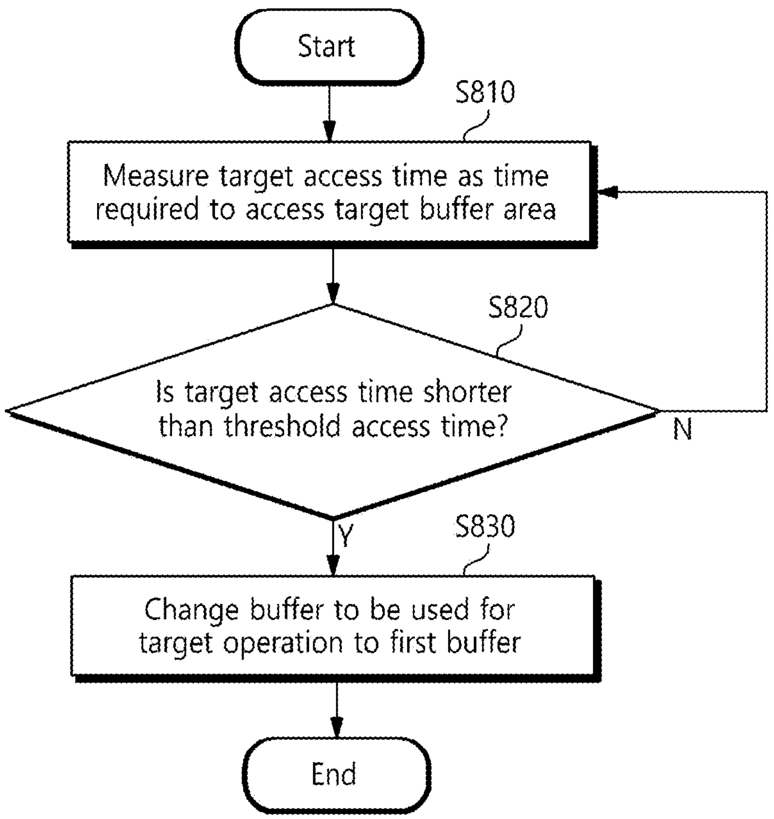
FIG. 8 is a diagram illustrating an operation in which the storage device according to embodiments of the present disclosure changes again a buffer associated with a target operation.

FIG. 8 is a diagram illustrating an operation in which the storage device 100 according to embodiments of the present disclosure changes again a buffer to be used for a target operation.

Referring to FIG. 8, the controller 120 of the storage device 100 may measure a target access time (or a target access time interval for accessing a target buffer area included in the first buffer BUF_1, while a buffer associated with the target operation (e.g., a buffer to be used for the target operation) is set as the second buffer BUF_2 (S810). [[NOTE:

For example, the target access time may be a time interval for the storage device 100 to write data to the first buffer BUF_1 or a time interval for the storage device 100 to read data stored in the first buffer BUF_1.

For another example, the target access time may be a time interval for moving data from the page buffer PG_BUF of the memory 110 to the first buffer BUF_1 through DMA or a time interval for moving data from the first buffer BUF_1 to the page buffer PG_BUF of the memory 110 through DMA.

The controller 120 determines whether the target access time interval is shorter than the aforementioned threshold access time (or the threshold access time interval) (S820).

When the target access time interval is shorter than the threshold access time interval (S820—Y), the controller 120 may change a buffer associated with the target operation (e.g., a buffer to be used for the target operation) to the first buffer BUF_1 (S830).

When the target access time interval is shorter than the threshold access time interval, the controller 120 may determine that, since a time interval required for transmitting data from the memory 110 (e.g., the page buffer PG_BUF therein) to the first buffer BUF_1, or a time interval receiving data from the first buffer BUF_1 to the memory 110, or both decrease, executing the target operation using the first buffer BUF_1 may further increase the performance of the target operation compared to using the second buffer BUF_2.

On the other hand, when the target access time interval is equal to or longer than the threshold access time interval (S820—N), the controller 120 may perform the operation S810 again. Before performing the operation S810 again, the controller 120 may wait for a preset delay time (or a preset delay time interval).

Figure 9:
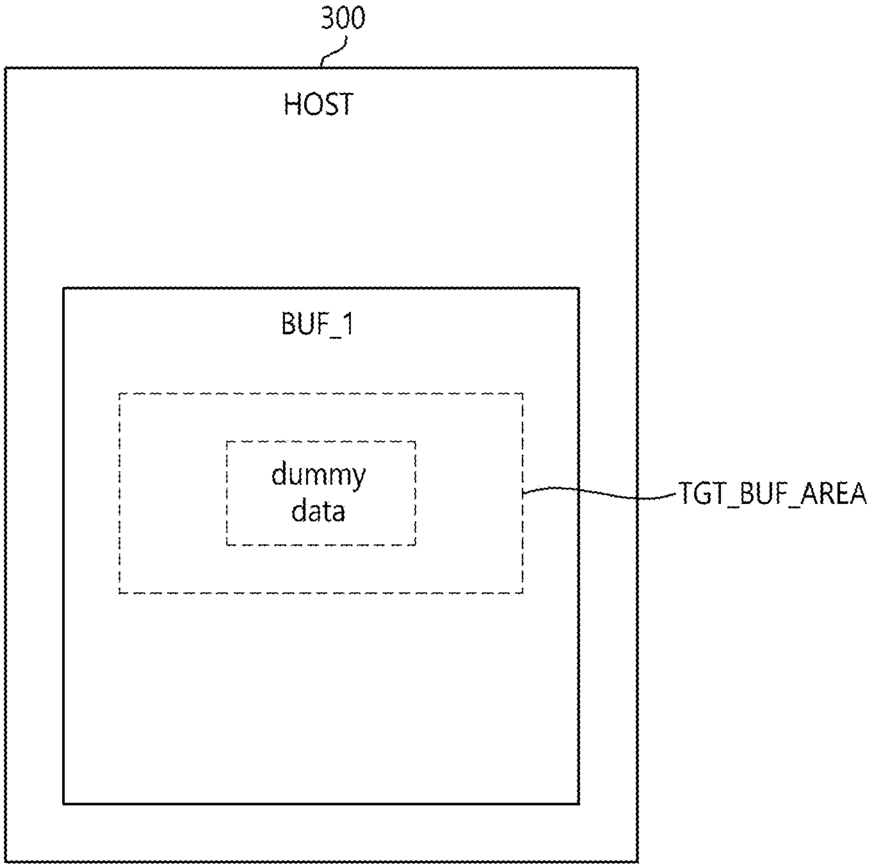
FIG. 9 is a diagram illustrating a target buffer area according to embodiments of the present disclosure.

FIG. 9 is a diagram illustrating a target buffer area TGT_BUF_AREA according to embodiments of the present disclosure.

Referring to FIG. 9, the target buffer area TGT_BUF_AREA is an area where dummy data unrelated to the target operation (e.g., not to be used for the target operation) is stored. Therefore, the target data TGT_DATA is not stored in the target buffer area TGT_BUF_AREA.

For example, the dummy data may be data which has a preset pattern.

For another example, the dummy data may be data whose all data bits are 1 or data whose all data bits are 0.

Figure 10:
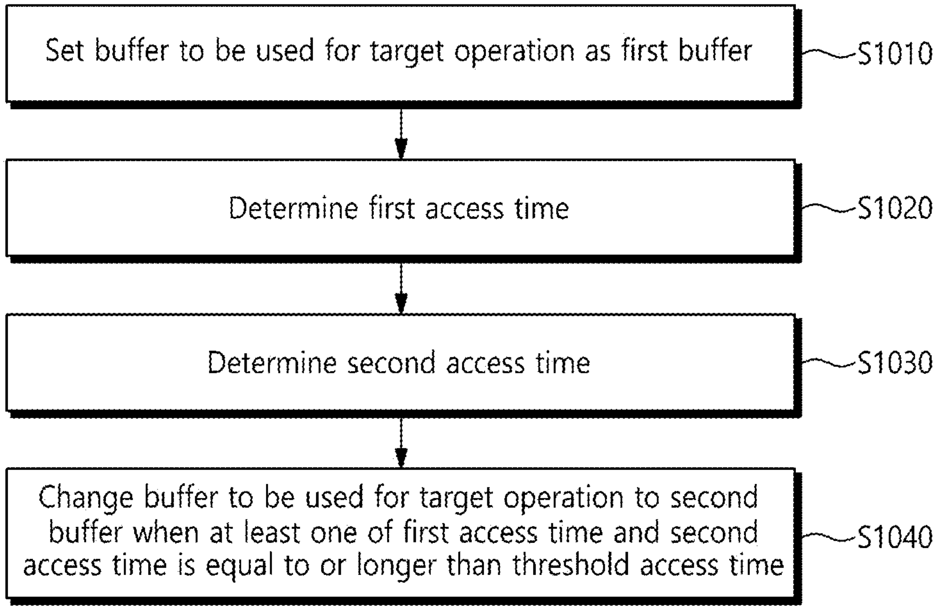
FIG. 10 is a diagram illustrating a method for operating a storage device according to embodiments of the present disclosure.

FIG. 10 is a diagram illustrating a method for operating a storage device (e.g., the storage device 100) according to embodiments of the present disclosure.

Referring to FIG. 10, the method for operating the storage device 100 may include operation S1010 of setting a buffer associated with a target operation of accessing target data (e.g., the target data TGT_DATA in FIG. 3) as a first buffer (e.g., the first buffer BUF_1 in FIG. 3), where the target data is stored in a memory 110. For example, the buffer associated with the target operation may be a buffer to be used for the target operation. The first buffer BUF_1 is located outside the storage device 100.

For example, the target operation may be an operation of migrating the target data TGT_DATA from a first memory area (e.g., the first memory area MEM_AREA_1 in FIG. 5) to a second memory area (e.g., the second memory area MEM_AREA_2 in FIG. 5) within the memory 110.

For example, the target data TGT_DATA may be metadata for user data stored in the memory 110.

The method for operating the storage device 100 may include operation S1020 of determining a first access time interval on the basis of moving data read from the memory 110 to the first buffer BUF_1 during the target operation.

For example, the operation S1020 may include measuring a plurality of first movement time intervals (e.g., the first movement time intervals MT_1 in FIG. 6) in a predetermined first time period (e.g., the first time period TP_1 in FIG. 6), data being moved from a page buffer (e.g., the page buffer PG_BUF in FIG. 6) included in the memory 110 to the first buffer BUF_1 during each of the first movement time intervals; and determining a first average movement time interval (e.g., the first average movement time interval AVT_1 in FIG. 6) as the first access time interval, where the first average movement time interval is an average of the first movement time intervals MT_1.

Each of the first movement time intervals MT_1 may be measured while the memory 110 outputs data.

The method for operating the storage device 100 may include operation S1030 of determining a second access time interval on the basis of moving data stored in the first buffer BUF_1 to the memory 110 in the target operation.

For example, the operation S1030 may include measuring a plurality of second movement time intervals (e.g., the second movement time intervals MT_2 in FIG. 7) in a predetermined second time period (e.g., the second time period TP_2 in FIG. 7), data being moved from the first buffer BUF_1 to the page buffer PG_BUF during each of the second movement time intervals; and determining a second average movement time interval AVT_2 as the second access time interval, where the second average movement time interval is an average of the second movement time intervals MT_2

Each of the second movement time intervals MT_2 may be measured while data is inputted to the memory 110.

The method for operating the storage device 100 may include operation S1040 of changing the buffer associated with the target operation to a second buffer BUF_2 when at least one of the first access time interval and the second access time interval is equal to or longer than a preset threshold access time interval. The second buffer BUF_2 is located inside the storage device 100.

The method for operating the storage device 100 may further include measuring a target access time interval for accessing a target buffer area (e.g., the target buffer area TGT_BUF_AREA in FIG. 9) included in the first buffer BUF_1 while the buffer associated with the target operation is set as the second buffer BUF_2; and changing the buffer associated with the target operation to the first buffer BUF_1 when the target access time interval is shorter than the threshold access time interval.

The target buffer area TGT_BUF_AREA may be an area where dummy data unrelated to the target operation is stored.

Although some embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
- a memory configured to store target data; and
- a controller configured to execute a target operation of accessing the target data,
- wherein the controller is configured to:
- set a buffer associated with the target operation as a first buffer;
- determine a first access time interval on a basis of moving data read from the memory to the first buffer in the target operation;
- determine a second access time interval on a basis of moving data stored in the first buffer to the memory in the target operation; and
- change the buffer associated with the target operation to a second buffer when at least one of the first access time interval and the second access time interval is equal to or longer than a preset threshold access time interval,
- wherein the first buffer is located outside the storage device,
- wherein the second buffer is located inside the storage device,
- wherein the memory includes a page buffer, and
- wherein the controller is configured to:
- determine the first access time interval as an average of time intervals for moving data from the page buffer to the first buffer during a predetermined first time period; and
- determine the second access time interval as an average of time intervals for moving data from the first buffer to the page buffer during a predetermined second time period.

2. The storage device according to claim 1, wherein the target operation is an operation of migrating the target data from a first memory area to a second memory area that are within the memory.

3. The storage device according to claim 2, wherein the target operation is a garbage collection operation or a read claim operation.

4. The storage device according to claim 1, wherein the target data is metadata for user data stored in the memory.

5. The storage device according to claim 1, wherein the controller is configured to:
- measure each of the first movement time intervals while the memory outputs data to the controller; and
- measure each of the second movement time intervals while data is inputted to the memory.

6. The storage device according to claim 1, wherein the controller is configured to:
- measure a target access time interval for accessing a target buffer area included in the first buffer, while the buffer associated with the target operation is set as the second buffer, and
- change the buffer associated with the target operation to the first buffer when the target access time interval is shorter than the threshold access time interval.

7. The storage device according to claim 6, wherein the target buffer area is an area where dummy data unrelated to the target operation is stored.

8. The storage device according to claim 1, wherein the first buffer has a storage capacity greater than that of the second buffer.

9. A method for operating a storage device, comprising:

setting a buffer associated with a target operation of accessing target data as a first buffer, the target data being stored in a memory of the storage device;

determining a first access time interval on a basis of moving data read from the memory to the first buffer in the target operation;

determining a second access time interval on a basis of moving data stored in the first buffer to the memory in the target operation; and changing the buffer associated with the target operation to a second buffer when at least one of the first access time interval and the second access time interval is equal to or longer than a preset threshold access time interval, wherein the first buffer is located outside the storage device, wherein the second buffer is located inside the storage device, wherein determining the first access time interval comprises:

measuring a plurality of first movement time intervals in a predetermined first time period, data being moved from a page buffer included in the memory to the first buffer during each of the first movement time intervals; and determining the first access time interval as an average of the first movement time intervals, and wherein determining the second access time interval comprises:

measuring a plurality of second movement time intervals in a predetermined second time period, data being moved from the first buffer to the page buffer during each of the second movement time intervals; and determining the second access time interval as an average of the second movement time intervals.

10. The method according to claim 9, wherein the target operation is an operation of migrating the target data from a first memory area to a second memory area within the memory.

11. The method according to claim 10, wherein the target operation is a garbage collection operation or a read claim operation.

12. The method according to claim 9, wherein the target data is metadata for user data stored in the memory.

13. The method according to claim 9, wherein:

each of the first movement time intervals is measured while the memory outputs data; and each of the second movement time intervals is measured while data is inputted to the memory.

14. The method according to claim 9, further comprising:

measuring a target access time interval for accessing a target buffer area included in the first buffer, while the buffer associated with the target operation is set as the second buffer; and changing the buffer associated with the target operation to the first buffer when the target access time interval is shorter than the threshold access time interval.

15. The method according to claim 14, wherein the target buffer area is an area where dummy data unrelated to the target operation is stored.

16. The method of according to claim 9, wherein the first buffer has a storage capacity greater than that of the second buffer.

17. A system comprising:

a host including a first buffer; and a storage device including a memory and a second buffer, wherein the storage device is configured to:

store target data, set a buffer associated with a target operation of accessing the target data as the first buffer, determine a first access time interval on a basis of moving data read from the memory to the first buffer in the target operation, determine a second access time interval on a basis of moving data stored in the first buffer to the memory in the target operation, and change the buffer associated with the target operation to the second buffer when at least one of the first access time interval and the second access time interval is equal to or longer than a preset threshold access time interval, wherein the storage device includes a page buffer, and wherein the storage device is configured to:

determine the first access time interval as a first average movement time interval, the first average movement time interval being an average of first movement time intervals in a predetermined first time period, data being moved from the page buffer to the first buffer during each of the first movement time intervals, and determine the second access time interval as a second average movement time interval, the second average movement time interval being an average of second movement time intervals in a predetermined second time period, data being moved from the first buffer to the page buffer during each of the second movement time intervals.

18. The system of claim 17, wherein the storage device is further configured to:

measure a target access time interval for accessing a target buffer area included in the first buffer, while the buffer associated with the target operation is set as the second buffer; and change the buffer associated with the target operation to the first buffer when the target access time interval is shorter than the threshold access time interval.

* * * * *